United States Patent Office 3,517,147
Patented June 23, 1970

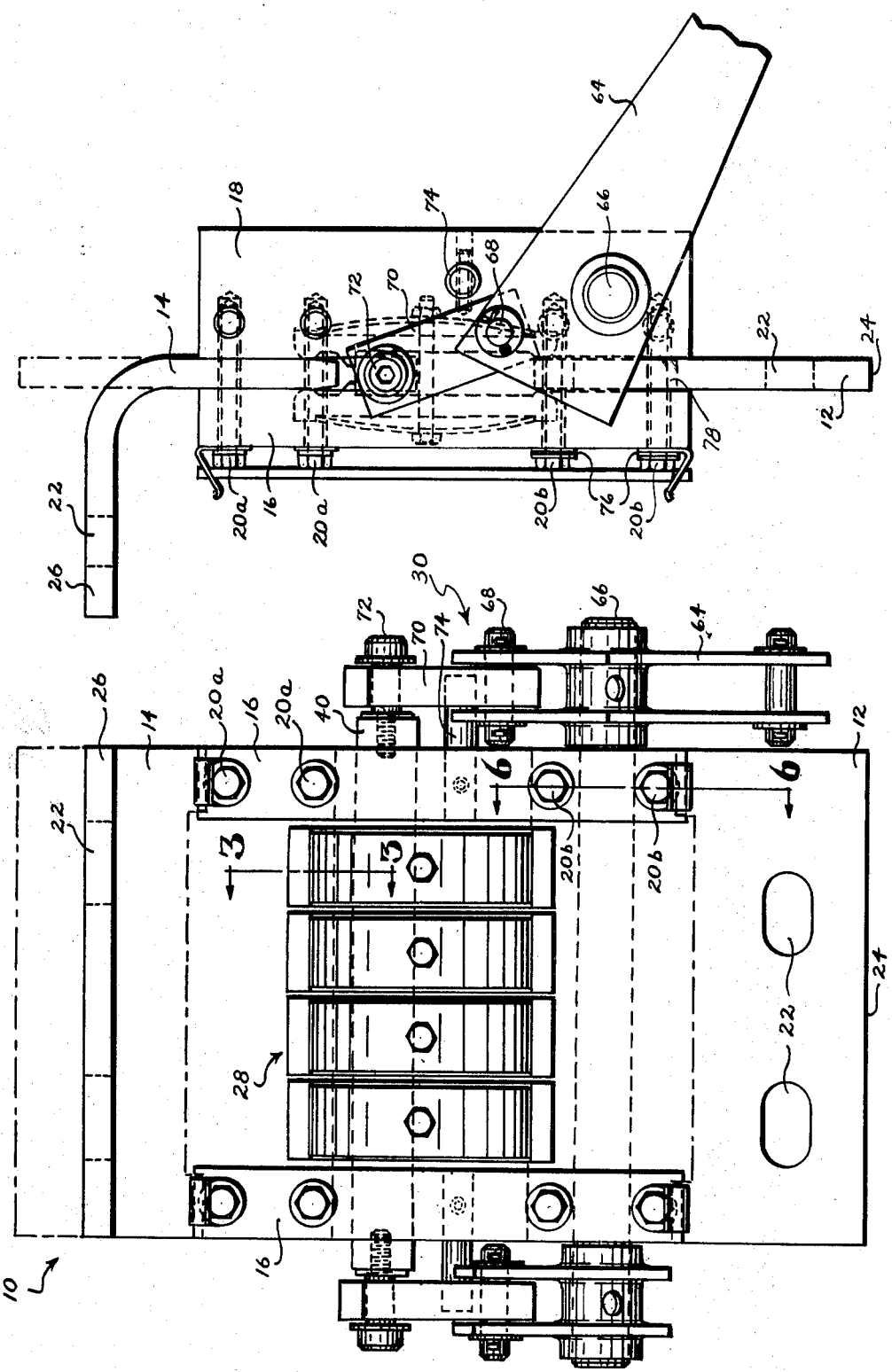

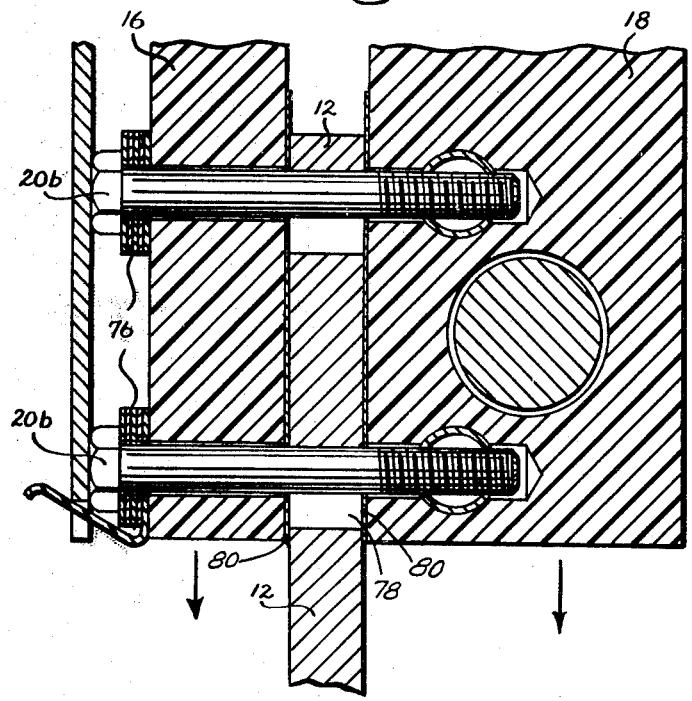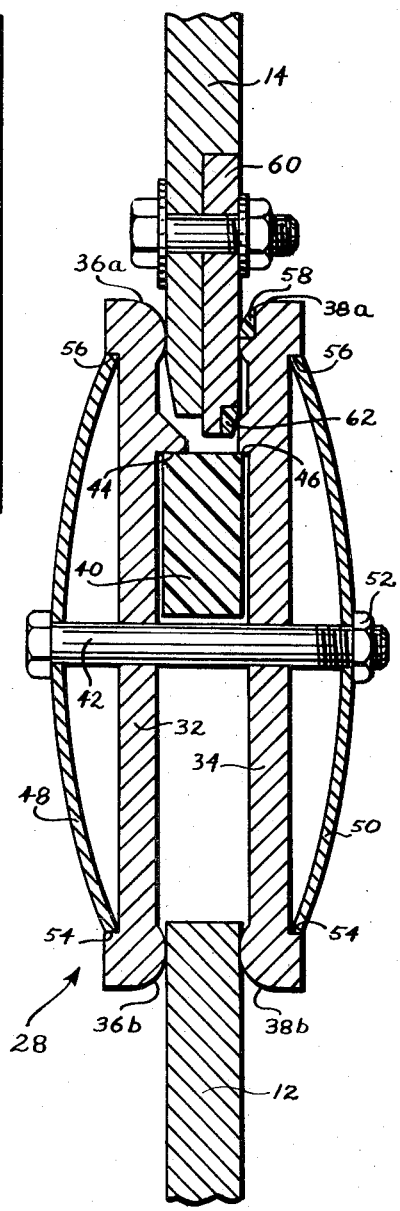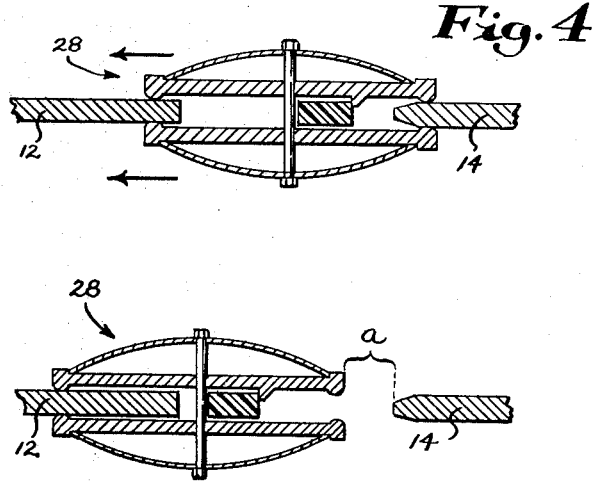

3,517,147
THERMAL EXPANSION COMPENSATING MODULAR HIGH CURRENT SWITCH
Victor A. Mortenson, Stoughton, Mass., assignor to Anderson Power Products, Inc., Boston, Mass., a corporation of Massachusetts
Continuation-in-part of application Ser. No. 527,162, Feb. 14, 1966. This application Apr. 26, 1968, Ser. No. 724,583
Int. Cl. H01h 1/36
U.S. Cl. 200—166    11 Claims

ABSTRACT OF THE DISCLOSURE

A modular, high current switch which automatically compensates for bus expansion. The switch has two relatively moveable, spaced, co-planar electrically conductive plates and at least one moveable contact assembly for establishing or interrupting a conductive path between the plates. The plates are held in spaced relation by a set of electrically insulative bridging members which are fixed relative to one plate and moveable relative to the other plate.

CROSS REFERENCE TO RELATED APPLICATION

This application is a continuation-in-part of my co-pending application Ser. No. 527,162, filed Feb. 14, 1966, for Modular High Current Switch, now Pat. No. 3,381,105.

BACKGROUND OF THE INVENTION

This invention relates to electrical switches and, more particularly, to a modular, high current switch which automatically compensates for thermal expansion of the current carrying member to which the switch is physically and electrically connected.

High current, heavy duty switching and transmission equipment are presently employed in a number of industries, such as, for example, the electrochemical industry. Typically, such equipment handles electrical currents in the order of 1,000 amperes or more. The high amperage currents produce substantial power losses in the form of heat which causes an appreciable thermal expansion of the current carrying equipment. It is not unusual to encounter a thermal expansion of up to 3/16 of an inch in a 6′ length of 1½ by 10″ aluminum bus carrying approximately 10,000 amperes where the ambient temperature is 40° C. Since the switching equipment is relatively light compared to the bus, such expansion can easily distort and permanently damage the switching equipment.

It is accordingly a general object of the present invention to provide a modular, high current switch which automatically compensates for the thermal expansion of the current carrying bus.

It is the specific object of the invention to provide a modular, high current switch which permits relative movement between two co-planar electrically conductive plates and a moveable contact assembly.

It is a feature of the present invention that the relative movement of the switch components which compensates for thermal expansion and contraction of the current carrying equipment is achieved without altering the alignment of the moveable contact assembly with respect to the spaced, co-planar, electrically conductive plates.

It is another object of the invention to reduce the friction between the relatively moveable components of the thermal expansion compensating switch without sacrificing the high contact clamping pressure obtained from the modular switch construction described in my above-mentioned co-pending application.

It is another feature of the present invention, that the existing modular, high current switches can be modified to provide thermal expansion compensation without requiring extensive and costly mechanical alterations.

These objects and other objects and features of the invention will be best understood from a detailed description of a preferred embodiment thereof, selected for purposes of illustration and shown in the accompanying drawings in which:

FIG. 1 is a plan view of a thermal expansion compensating switch;

FIG. 2 is a side elevation of the switch depicted in FIG. 1;

FIG. 3 is a view in cross section taken along lines 3—3 in FIG. 1 showing one of the moveable contact assemblies;

FIG. 4 is a view similar to that shown in FIG. 3, but on a reduced scale illustrating one moveable contact assembly in the MAKE position;

FIG. 5 is similar to the view in FIG. 4 and is drawn to the same scale showing the moveable contact assembly in the BREAK position; and, FIG. 6 is a view in cross section taken along lines 6—6 in FIG. 1 showing one of the two co-planar electrically conductive plates and two clamped, insulative bridging members moveable relative thereto.

Turning now to the drawings and particularly to FIGS. 1 and 2 thereof, there is shown in plan view and side elevation, respectively, a modular, thermal expansion and contraction compensating switch constructed in accordance with the present invention and identified generally by the reference numeral 10. The switch 10 is an improvement of the basic, modular, high current switch described in the above-mentioned co-pending application Ser. No. 527,162. Since the components and construction of the basic switch are fully described in the co-pending application, they will not be discussed in detail herein. Instead, the following description will be directed primarily to the specific components and mechanical assembly of the improved switch which allow relative movement of the switch elements during thermal expansion and contraction while at the same time maintaining the operational advantages of the basic, modular, switch design.

The major components of the improved switch 10 are illustrated in FIGS. 1 and 2. Two relatively moveable, electrically conductive termination plates 12 and 14 are held in spaced, co-planar relation by at least one pair of electrically insulative bridging members 16 and 18. The bridging members are secured in sandwiched relation on opposite sides of the electrically conductive plates 12 and 14 by a plurality of bolts identified by the reference numerals 20a and 20b. It is sufficient for the moment to note that bridging members 16 and 18 are tightly clamped to and fixed with respect to plate 14, but are moveable with respect to plate 12.

Both termination plates are provided with means for electrically and mechanically securing the plates to an external circuit component, such as, for example, a bus bar (not shown). The securing means comprises a plurality of stud mounting holes 22 which are located at spaced intervals along the outer edges 24 and 26, respectively, of plate 12 and 14. The elongated, oval configuration of the stud mounting holes 22 provides a limited, but desirable degree of flexibility in positioning the termination plates 12 and 14 to compensate for any slight misalignment of the plates and external circuit components. Other mounting means can, of course, be used to both electrically and mechanically connect switch 10 to the external circuit. In addition, either one or both of the co-planar termination plates 12 and 14 can have its end portion bent, as shown in FIGS. 1 and 2, to facilitate mounting the switch to the external circuit components.

The modular, thermal expansion compensating switch 10 of the present invention electrically comprises a single pole, single throw switch (SPST). The relatively movable co-planar plates 12 and 14 are electrically bridged by at least one movable contact assembly which is indicated generally in FIGS. 1, 3, 4 and 5 by the reference numeral 28. It can be seen in FIG. 1 that four individual contact assemblies 28 are utilized to establish and interrupt a corresponding number of conductive paths between the termination plates 12 and 14. Additional contact assemblies can be added as described in my co-pending application. The contact assemblies are moved in unison by a mechanical linkage indicated generally, in FIG. 1, by the reference numeral 30.

The construction of each movable contact assembly 28 can best be understood from an examination of the enlarged cross-sectional view illustrated in FIG. 3. Each contact assembly 28 comprises two, spring loaded electrically conductive contact bars or "fingers" 32 and 34 having corresponding convex contact members 36a and 36b and 38a and 38b, respectively, located at the ends thereof. The contact bars 32 and 34 are positioned on opposite sides of a contact assembly carrier bar 40 with the convex contact members facing each other. The lateral and longitudinal placement of the contact bars 32 and 34 with respect to the carrier bar 40 are controlled by the position of fastener 42 and the two contact bar shoulders 44 and 46. It can be seen in FIG. 1 that the longitudinal axes of the contact bars 32 and 34 are normal to the longitudinal axis of the carrier bar 40 while the transverse axes of the contact bars are parallel to the carrier bar axis. This arrangement produces a substantially "LINE" contact when the assemblies are moved from the BREAK position (FIG. 5) into electrical contact with termination plate 14 in the MAKE position (FIG. 4).

Leaf springs 48 and 50 provide the requisite spring loading or biasing for contact bars 32 and 34. The amount of spring biasing can be individually adjusted for each contact assembly 28 by varying the position of lock nut 52 along the threaded portion of the carriage bolt 42. The integrally formed contact bar shoulders 54 and 56 serve a dual function by controlling the alignment of the leaf springs 48 and 50 with respect to the longitudinal axes of the contact bars and secondly, limiting the outward extension of the leaf springs as the nut 52 is advanced towards the head of carriage bolt 42.

Contact arcing can be a serious problem in switching of high amperage currents, especially if the switched circuit contains a substantial amount of inductance. Preferably, the damage caused by arcing should be confined to a predetermined number of contact bars which can be easily replaced when necessary. Looking at FIG. 3, the right hand contact bar 34 has a brazed arcing alloy 58 positioned on the leading edge of the convex contact member 38a. The planar termination plate 14 is provided with a removable arcing member 60 which has a brazed arcing alloy 62 located along the leading edge of the arcing member. Since the arcing member extens beyond the termination plate 14, the first "MAKE" and last "BREAK" of the circuit will occur between the removable arcing member 60 and the arcing alloy 58, thereby confining the arcing damage to these components.

The contact assemblies 28 are moved in unison by the carrier bar 40 between a MAKE position shown in FIGS. 3 and 4 and a BREAK position shown in FIG. 5. Reciprocatory movement of the carrier bar 40 is provided by actuation of the mechanical linkage 30. Looking at FIGS. 1 and 2, a switch lever arm 64 is mounted on a shaft 66 which is journaled in the lower bridging member 18. When the arm 64 is rotated about the axis of shaft 66, the movement is transmitted through connecting pin 68 to an intermediate link 70 and then to another connecting pin 72 which is threadably secured to the carrier bar 40, as shown in FIG. 1. Since the bar 40 is positioned between and slidably held by the bridging members 16 and 18, rotation of the intermediate link 70 will cause the carrier bar, and therefore, the switch contact assemblies 28, to move in a reciprocatory manner between the MAKE and BREAK positions illustrated in FIGS. 4 and 5, respectively. The maximum throw distance for the switch is controlled by a stop pin 74 which limits the movement of the intermediate link 70.

In switching equipment of this type it is important to maintain the accurate alignment of the switch components and to keep a constant air gap distance between the movable contact asemblies and the termination plate when the switch is in the open circuit or BREAK position. The alignment of the switch components is achieved and maintained by referencing the components to one of the two electrically conductive termination plates 12 and 14. In the embodiment illustrated in the drawings, the bridging members 16 and 18, contact assemblies 28, contact assembly mechanical linkage 30 and the contact carrier bar 40 are all referenced to the termination plate 14. It has already been mentioned that the two termination plates 12 and 14 are relatively movable and that the insulative bridging members 16 and 18 are tightly clamped to and fixed with respect to plate 14, but are movable with respect to plate 12. Referring to FIGS. 1, 2 and 6, bolts 20a are used to tightly fasten the bridging members 16 and 18 to termination plate 14 in sandwiched relation thereto. The two bridging members are, therefore, fixed relative to plate 14. However, the other ends of the two bridging members are not tightly secured to the corresponding termination plate 12.

Looking at FIGS. 2 and 6, and especially the enlarged view of FIG. 6, it can be seen that the corresponding bolts 20b are not screwed down completely, but instead are spring loaded by a plurality of disc springs 76. The disc spring mounting system allows the two bridging members to spread slightly with respect to termination plate 12. The bridging members are also free to move longitudinally with respect to plate 12, as shown by the arrows in FIGS. 4 and 6. This freedom of movement with respect to plate 12 is achieved by using elongated, oversized bolt mounting holes 78 in the termination plate 12, as shown in FIGS. 2 and 6. The extent of the allowable movement is determined by the size of the mounting holes 78 and should be sufficient to compensate for any anticipated thermal expansion and contraction. Preferably, sliding friction between the bridging members and plate 12 is reduced by interposing a strip of suitable material 80 having a low coefficient of friction, such as, the fluoroplastics, between the relatively moving surfaces.

It will be appreciated that the described mounting system permits relative movement between termination plate 12 and the entity comprising the other termination plate 14, bridging members 16 and 18, the contact assemblies 28 and their drive mechanism. Since the contact assemblies and drive mechanism, i.e., mechanical linkage 30 and carrier bar 40 are referenced to the bridging members 16 and 18, which in turn are fixed with respect to plate 14, it can be seen that the open circuit air gap distance, identified by the small letter $a$ in FIG. 5, will remain constant even through thermal expansion and contraction produces relative movement between termination plate 12 and the other switch components.

Having described in detail the structure and operation of the thermal expansion compensating switch of the present invention, it will now be apparent to those skilled in the art that numerous modificatitons can be made without departing from the scope of the invention. What I claim and desire to secure by Letters Patent of the United States is:

1. An electrical switch comprising:
   first and second co-planar, electrically conductive plates;
   means secured to said plates for holding the plates in spaced, co-planar, electrically insulative relation,
said holding means allowing relative movement between the plates for a predetermined open circuit distance within the plane of said plates to accommodate thermal expansion of at least said plates;
at least one moveable contact means positioned between the plates for establishing or interrupting a conductive path between said plates; and,
means operatively connected to the movable contact means for moving said moveable contact means between an open circuit position and a closed circuit position.

2. The electrical switch of claim 1 wherein said moveable contact means is in electrical contact with said first plate in both the open and closed circuit positions and in electrical contact with said second plate only in closed circuit position.

3. The electrical switch of claim 2 further characterized by said holding means being fixed with respect to said second plate.

4. The electrical switch of claim 3 further characterized by said holding means limiting the movement of said contact moving means to movement within the plane of said plates.

5. The apparatus of claim 3 further characterized by said contact moving means maintaining a constant air gap distance between said moveable contact means and said second plate when the moveable contact means is in the open circuit position.

6. The electrical switch of claim 2 further characterized by said moveable contact means comprising:
a pair of substantially planar electrically conductive bars each having convex contact members at the ends thereof,
said contact bars positioned in parallel, spaced relation with the convex contact members of the two contact bars facing each other; and
means spring loading said contact bars.

7. The electrical switch of claim 6 further characterized by
said second plate having a straight contact member engaging edge,
said convex contact members each having a generally semi-cylinder configuration with the axis thereof normal to the longitudinal axis of the contact bar, and said contact moving means moving the contact bars in a direction parallel to the longitudinal axis of said contact bars, and normal to the straight edge of said second plate so that said pair of convex contact members slidably engages and remains in electrical contact with siad second plate in a line contact in the closed circuit position while the other pair of convex contact members slides across said firstplate in line contact therewith.

8. The electrical switch of claim 2 wherein said holding means comprises:
at least one set of bridging members with each set comprising:
a first electrically insulative bridging member positioned on one side of said plates,
said first bridging member having a length greater than the maximum separation between said plates, and
a second electrically insulative bridging member positioned on the other side of said plates,
said second bridging member having a length greater than the maximum separation between said plates;
and, means maintaining bridging members and plates in sandwiched relation with said bridging members being fixed relative to said second plate and moveable relative to said first plate.

9. The electrical switch of claim 8 wherein said contact moving means includes a carrier bar for moving said movable contact means between the open and closed circuit positioins, said carrier bar positioned between and slidably held by said bridging members; and means reciprocatorally moving said carrier bar, said contact moving means being referenced to said second plate.

10. The electrical switch of claim 8 further characterized by means spring loading said bridging members with respect to said first plate.

11. The electrical switch of claim 10 further characterized by means reducing sliding friction between said first plate and said spring loaded bridging members.

References Cited
UNITED STATES PATENTS

| | | | |
|---|---|---|---|
| 2,303,425 | 12/1942 | Bickman | 200—163 X |
| 2,751,471 | 6/1956 | Wills | 200—164 X |
| 3,087,039 | 4/1963 | Bachman. | |
| 3,201,556 | 8/1965 | Baird. | |
| 3,328,550 | 6/1967 | Miller. | |

H. O. JONES, Primary Examiner

U.S. Cl. X.R.

200—164